United States Patent
Ross

[11] Patent Number: 5,810,501
[45] Date of Patent: Sep. 22, 1998

[54] PERPENDICULAR EDGE FASTENER

[75] Inventor: Harold D. Ross, Chalfont, Pa.

[73] Assignee: Penn Engineering & Manufacturing Corp., Danboro, Pa.

[21] Appl. No.: 853,488

[22] Filed: May 9, 1997

Related U.S. Application Data

[60] Provisional application No. 60/028,735 Oct. 22, 1996.

[51] Int. Cl.⁶ ..................................................... F16B 5/02
[52] U.S. Cl. ........................... 403/231; 403/260; 403/281
[58] Field of Search .................................... 403/231, 230, 403/260, 256, 326, 407.1, 405.1, 274, 279, 281, 262, 282, 404

[56] References Cited

U.S. PATENT DOCUMENTS

| | | |
|---|---|---|
| 2,040,374 | 5/1936 | Grimes . |
| 2,649,126 | 8/1953 | Tinnerman . |
| 2,974,703 | 3/1961 | Rapata ................................ 403/231 X |
| 3,084,211 | 4/1963 | Rapata . |
| 3,106,994 | 10/1963 | Scott . |
| 3,110,338 | 11/1963 | Rapata . |
| 3,155,771 | 11/1964 | Steger et al. . |
| 3,425,725 | 2/1969 | Givot et al. . |
| 3,443,617 | 5/1969 | Whiteside et al. . |
| 3,527,280 | 9/1970 | MacNorius ........................... 403/256 X |
| 3,816,011 | 6/1974 | Biebuyck et al. ................... 403/260 X |
| 4,358,234 | 11/1982 | Takegawa et al. ............... 403/407.1 X |
| 4,627,760 | 12/1986 | Yagi et al. .......................... 403/230 X |
| 4,753,561 | 6/1988 | Betterton et al. ................ 403/407.1 X |
| 5,452,978 | 9/1995 | Winton, III . |

FOREIGN PATENT DOCUMENTS 197135    5/1923   United Kingdom ................ 403/407.1

*Primary Examiner*—Harry C. Kim
*Attorney, Agent, or Firm*—Gregory J. Gore

[57] ABSTRACT

A clinch-type fastener permits sheets to be joined at a right angle corner. The fastener includes a rectangular base with clinch-type undercut grooves along the sides. The base is connected to a partial cylindrical channel defining an axial bore for receiving a screw or pin. The axis of the channel is parallel to the undercuts and to a first sheet into which the base is clinched being received by a corresponding aperture in the base sheet. Tapered guides located on each side of the fastener directly above the undercuts facilitate placement of the insert into the sheet prior to clinching. The fastener is preferably formed by extruding metal to form a long length of material having this lateral profile. Individual fasteners can then be produced simply by cutting an elongate extrusion into small segments.

15 Claims, 3 Drawing Sheets

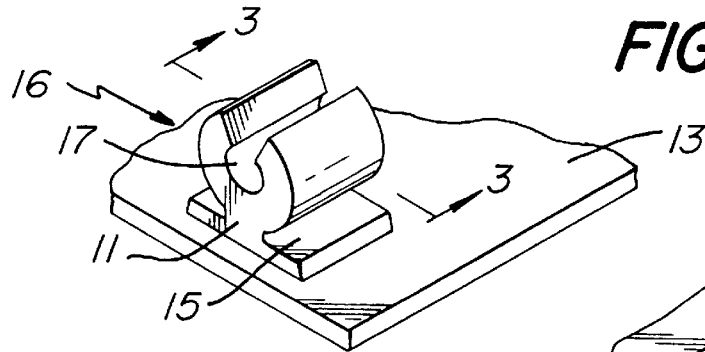
FIG. 1
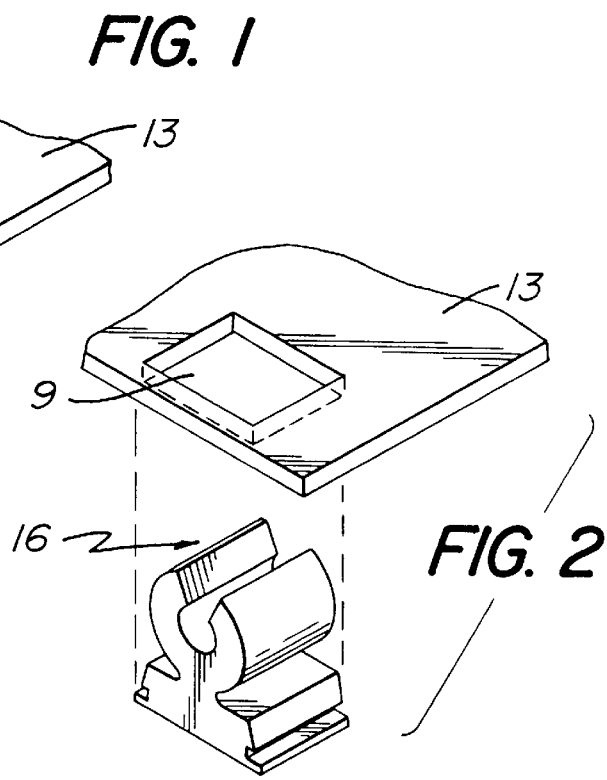
FIG. 2
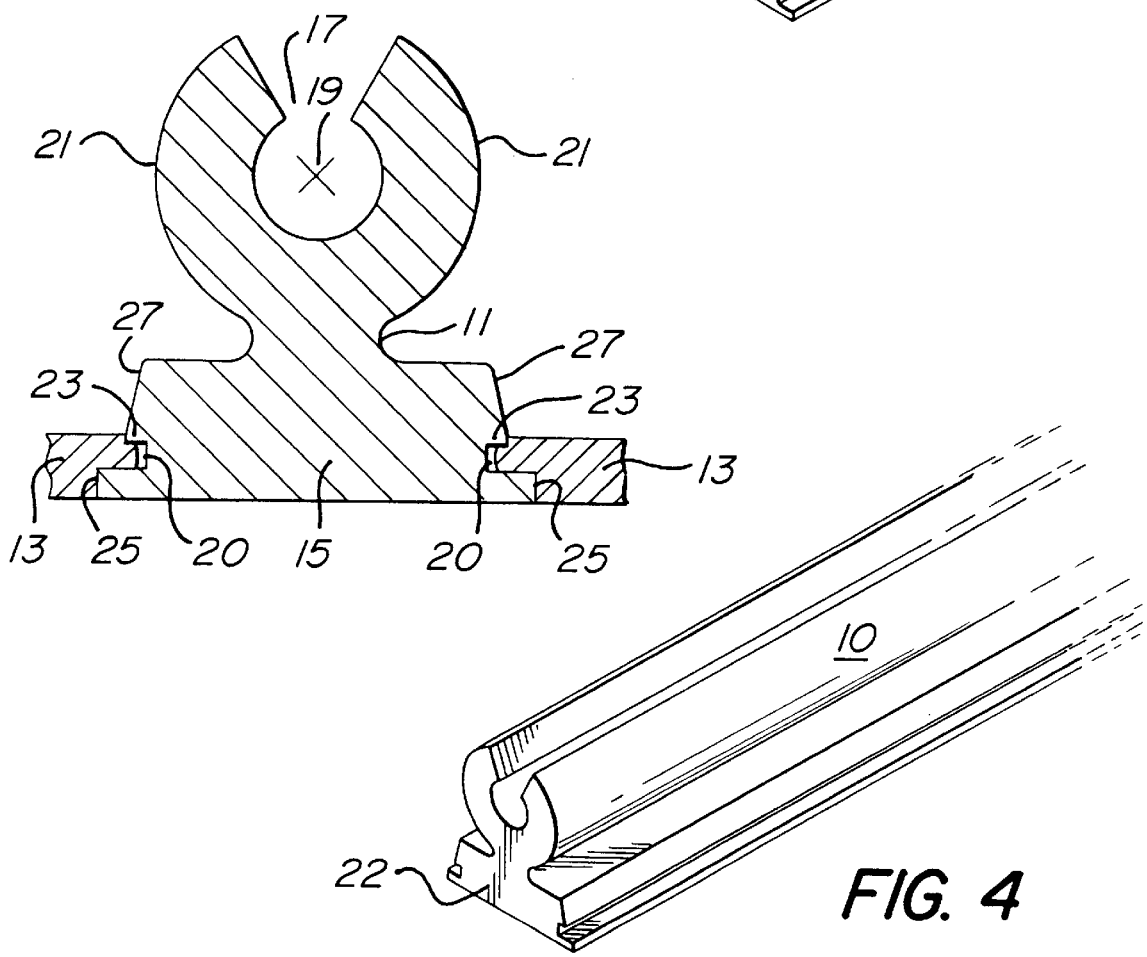
FIG. 3
FIG. 4

PERPENDICULAR EDGE FASTENER

Priority based upon provisional application Ser. No. 60/028,735 filed on Oct. 22, 1996, entitled "Perpendicular Edge Fastener", is hereby claimed.

FIELD OF THE INVENTION

The present invention relates to a perpendicular edge fastener that permits two separate sheets to be joined at right angles. More specifically, it relates to a perpendicular, metal, clinch-type insert that is press-fitted into an opening in one of the sheets to be joined.

BACKGROUND OF THE INVENTION AND DESCRIPTION OF PRIOR ART

It is known in the metal fastening arts to join two intersecting planar sheets through intermediate fastening means utilizing a clinch-type metal insert. Fasteners of this type include a support surface and fastening means to hold a second sheet at right angles to the base sheet in which the fastener is installed. Such a prior art device is described in U.S. Pat. No. 5,489,175 issued to Winton. As disclosed in the Winton patent, his fastener requires that the self-clinching lands which accept a cold flow of metal from the base sheet to be located along the edge parallel to the surface which supports the second sheet. This prevents the fastener from being installed very close to the edge of the base sheet because there would not be sufficient material to support the flow of metal into the undercut. This is a severe limitation, especially where it is desired to have the two sheets meet at an outside corner with no overlap. Another drawback of this device is the expense of machining the individual fasteners which requires tapping a threaded hole to receive a headed fastener that holds the second sheet to the insert.

U.S. Pat. No. 3,106,994 issued to Scott shows an insert which is fitted through a rectangular hole in the base. A perpendicularly aligned second sheet is secured through the mutual wedging effect of a self-tapping screw against the base sheet. The same screw also holds the second sheet. The Scott insert does not separately grip the base panel and it cannot be used to form smooth outer corners between intersecting sheets.

There is therefore a need in the art for a convenient, inexpensive, and effective fastener to join intersecting sheets, especially to form an outside corner.

SUMMARY OF THE INVENTION

In order to solve the needs in the art, the present fastener has been devised. It includes a rectangular base with clinch-type undercut grooves on the sides. The base is connected to a partial cylindrical channel defining an axial bore for receiving a screw or pin. The axis of the channel is parallel to the undercuts and to a first sheet into which the base is clinched being received by a corresponding aperture in the base sheet. Because the lands and undercuts which perform the clinching function are parallel to the axis of the channel, all of the structures of the insert may be formed by an extension of the lateral profile in the axial direction. This permits the fastener to be formed by extruding metal to form a long length of material having this lateral profile. The specific configuration of structures requires the minimum amount of extrusion material. The individual fasteners can then be created simply by cutting an elongate extrusion into small segments. Further, by designing the fastener to receive a thread-forming screw, the threading operation in production is eliminated. Consequently, the fastener of the present invention may be manufactured very inexpensively.

In addition to low cost of production, a major advantage of the present invention is its ability to form smooth cabinet corners from assembled sheets. This is possible because the clinching lands and undercuts are located along the sides of the fastener parallel to the axis of the barrel and not along the front or back faces. Thus, the fastener may be positioned very close to the edge of the base sheet. Hence, the second sheet may be joined flush with the edge of the base sheet. This is not possible with any prior art fastener. While some amount of pull-out resistance may be sacrificed without undercuts at the front and back faces, many greater benefits are achieved and thus this feature is critical to the invention.

In another application, the present fastener may be used as a hinge block in which case the bore of the channel receives a hinge pin, rather than a thread-forming screw. In any event, the base and receiving aperture are preferably rectangular, but not square so that it cannot be misapplied (i.e., rotated 90-degrees from proper alignment). Because the present insert is symmetrical front-to-back, positions 180-degrees apart are structurally identical. Thus, installation is foolproof, fast, and inexpensive, providing yet another advantage of the present invention.

It is therefore the primary object of the present invention to provide an insert which can attach two sheet panels at right angles, which is easily applied and resistant to being mis-installed. It is a further object of the present invention to provide joinder means for two sheet metal panels such that the edges of the panels do not overlap and thus may be assembled to form a smooth outer corner. It is another object of the present invention to form an elongate extrusion of material which may later be cut into smaller segments to create a plurality of perpendicular edge fastener inserts. It is yet another object of the present invention to provide a perpendicular edge fastener insert which may also be used for other purposes, such as a hinge block.

Other objects, advantages and novel features of the invention will become apparent from the following detailed description of the invention when considered in conjunction with the accompanying drawings.

BRIEF DESCRIPTION OF THE DRAWINGS

FIG. 1 is a front top right perspective view of the present invention installed in the base sheet.

FIG. 2 is a top right front perspective view of the present invention and the base sheet shown in alignment prior to installation.

FIG. 3 is a front sectional view taken from FIG. 1 as shown in that figure.

FIG. 4 is a front top right perspective view of an elongate extrusion from which segments may be cut to produce the present fastener.

DESCRIPTION OF THE PREFERRED EMBODIMENT

Figure 5:
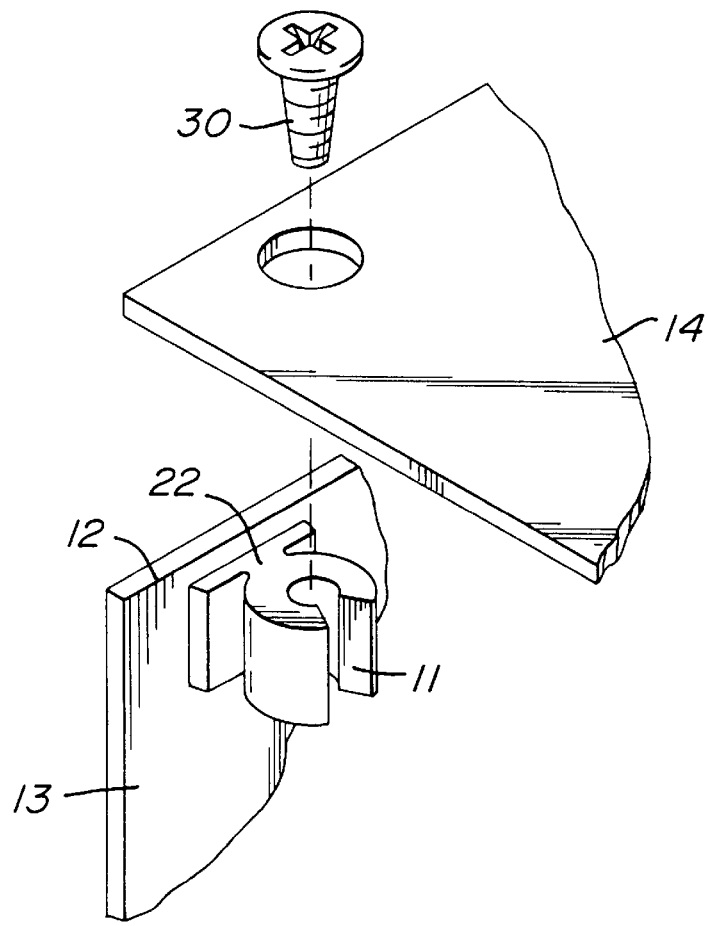
FIG. 5 is a top right front exploded assembly view showing the assembly of the second sheet with securing screw.

Referring to FIG. 1, the insert of the present invention 16 is depicted installed into sheet 13. This insert is a unitary part and includes base portion 15, a narrow neck region 11, and partially cylindrical channel 17. FIG. 2 shows the alignment and direction of installation of the present invention 16 into sheet 13 as it is pressed and clinched into aperture 9 of the sheet. The base and receiving aperture are preferably rectangular, but not square.

Referring now to FIG. 3, the clinch attachment structures of the present invention are more clearly shown. Undercut grooves 20 are located at the side edges of the base and are parallel to the axis 19 of the channel 17 formed between right and left semi-cylindrical arms 21. The undercut grooves 20 are located between pairs of upper and lower lands 23 and 25 respectfully on each side of the fastener. As the fastener is pressed into sheet 13 against an appropriate anvil well-known in the arts (not shown in this figure), material displaced by land 25 flows into the undercut grooves and thereby clinches the fastener into the sheet. The lands and undercut grooves are formed in base 15 which also includes right and left side tapered guides 27 that facilitate placement of the insert into the sheet prior to clinching. A narrow neck 11 connects the top of the base 1 5 to a pair of upwardly extending partial cylindrical arms 21.

Referring now to FIG. 4, the lateral profile of the present invention is continuous throughout the length of the fastener and, thus, a multiplicity of fasteners may be formed from a single length of extruded material 10 as shown in this figure. By simply cutting the extrusion into small segments, individual fasteners can be formed. Parallel and planar front and rear faces, such as face 22, which ultimately provide support surfaces for attached sheets created as a result of the cutting operation. Therefore, the length of the fasteners may be selected when the extrusion is cut at some time after it is fabricated and stored. This reduces the inventory and stocking requirements of fasteners of different lengths which may be later cut as necessary from a supply of elongate extrusions of uniform length. The extrusion material may be grade 6061-T6 which is sufficiently hard to clinch into aluminum sheets. When used with harder sheets, such as steel, inserts of the present invention may have to be either machined, cast or molded from steel and plated, or supplied unplated so that customers can plate the whole assembly in place.

Referring now to FIG. 5, an assembly of the present invention is shown with the front face 22 of the present insert installed very close to edge 12 of base sheet 13. Second sheet 14 is then affixed by screw means 30 which passes through an aperture in the second sheet. Screw means 30 is preferably a thread-forming or thread-cutting screw with threads having the ability to form or cut into the inside walls of the arms to achieve a threaded engagement.

Figure 6:
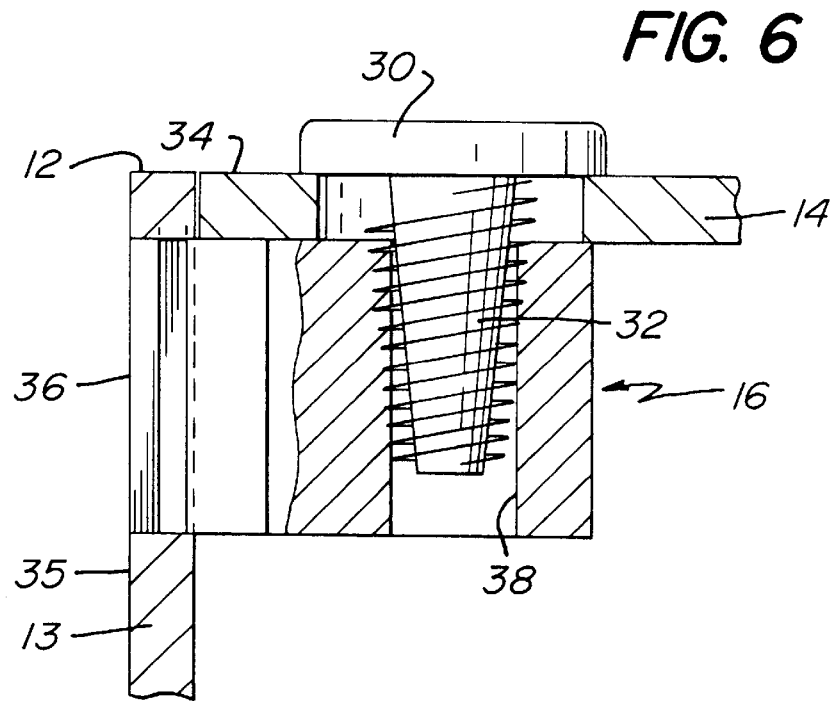
FIG. 6 is a side sectional view of a corner joint formed by the assembly of parts shown in FIG. 5.

The assembly of FIG. 5 is shown with greater detail in FIG. 6. FIG. 6 illustrates how effectively the present fastener insert may be used to form a smooth corner joint. Because the insert is located one sheet thickness away from edge 12 of the base sheet 13, the edge 12 can be flush with the outside surface 34 of the second sheet 14. The fastener insert of the present invention is preferably installed from the outside surface 35 of the base sheet 13, and hence the bottom of the fastener 36 may be easily installed flush with the outside surface 35 so that a smooth appearance on all sides of the assembly is achieved. FIG. 6 also more closely depicts the engagement between the threads 32 of the thread-forming screw 30 and the inner wall 38 of the channel bore.

Figure 7A:
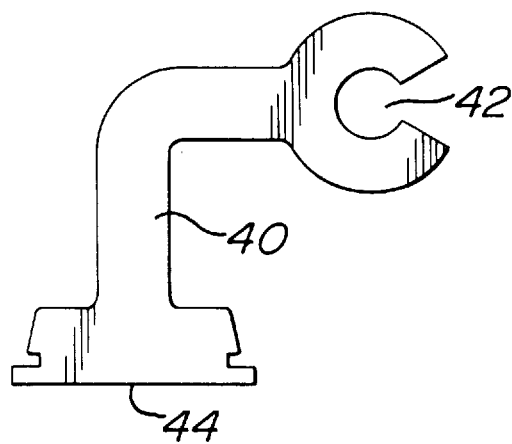
FIGS. 7a through 7c are front elevational views of alternate embodiments.
Figure 7B:
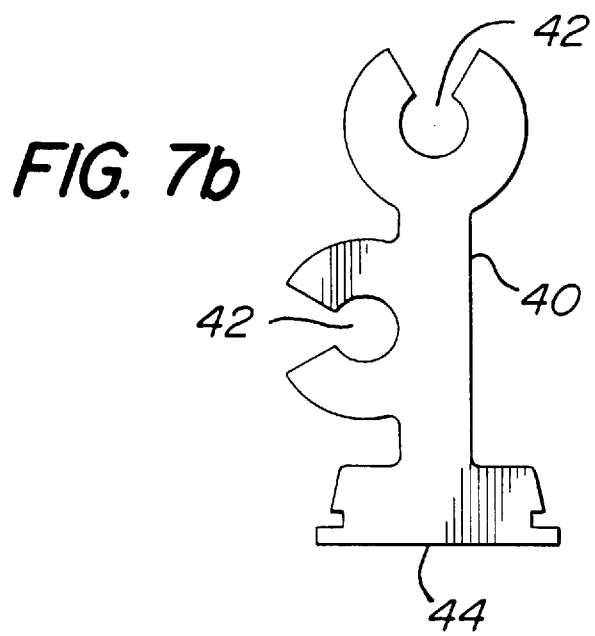
Figure 7C:
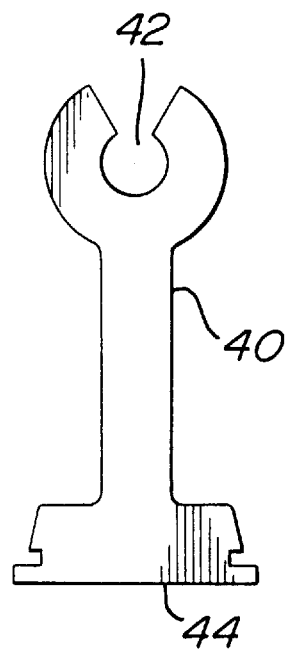

Referring now to FIGS. 7a, b, and c, other embodiments of the present invention may utilize an elongate neck 40 between the channels 42 and the bases 44. These other configurations demonstrate how the channels may be located at different positions from the base as desired. FIG. 7b shows the use of multiple channels 42 stemming from the same base 44. An angled neck may be selected to provide additional support to the second sheet or position the channel at any desired location.

Other modifications and adaptations of the present invention will also be apparent to those of skill in the mechanical arts without departing from the invention. For example, the insert of the present invention may also be used as a hinge block for receiving a hinge pin about which another structure pivots. It will also be appreciated that the thread-forming screw may be replaced with a nut and bolt combination, since the channel extends through the entire length of the fastener. Finally, while the configuration of the present invention provides for separate semi-circular arms to form a discontinuous cylindrical bore, it should be understood that the arms may be replaced with a fully-formed cylindrical sleeve if production means other than extrusion are chosen to fabricate the insert.

It should be understood that the above description discloses specific embodiments of the present invention and are for purposes of illustration only. There may be other modifications and changes obvious to those of ordinary skill in the art that fall within the scope of the present invention which should be limited only by the following claims and their legal equivalents.

What is claimed is:

1. A metal, clinch-type insert, comprising:
   a rectangular rigid metal base having opposing side edges, each side edge including a pair of lands with an undercut groove located between each of said pairs of lands for receiving a cold flow of metal; and,
   a neck connecting the top of said base to a pair of upwardly extending partially-cylindrical arms forming an open channel and a bore with an axis parallel to said grooves therebetween, said neck holding said channel away from said base.

2. The metal clinch-type insert of claim 1, wherein each of said edges of the base further include a tapered guide located above said pair of lands.

3. The metal clinch-type insert of claim 2, wherein said base is rectangular with adjacent sides of unequal length.

4. The metal clinch-type insert of claim 1, further described as being a segment cut from an elongate extrusion.

5. The metal-clinch type insert of claim 4, wherein said extrusion is composed of 6061-T6 aluminum.

6. The metal-clinch type insert of claim 1, further described in that said neck is elongate.

7. The metal-clinch type insert of claim 6, further including a second channel attached to said elongate neck.

8. The combination of a metal, clinch-type insert affixed to a metal sheet, comprising:
   a first metal sheet;
   an insert clinched into said sheet by deformation of said sheet, said insert having a rectangular rigid metal base having opposing side edges, each side edge including a pair of lands with an undercut groove for receiving a cold flow of metal from said first metal sheet located between each of said pairs of lands; and
   a neck connecting the top of said base to a pair of upwardly extending partially-cylindrical arms forming an open channel and a bore with an axis parallel to said grooves therebetween, said neck holding said channel away from said first sheet.

9. The combination of claim 8, further including a planar support surface which extends the full height of the insert from the bottom of the base to the top of said channel-forming arms.

10. The combination of claim 9, further including a second sheet affixed to said insert, said second sheet laying directly against said support surface.

11. The combination of claim 10, wherein said aperture in said first sheet is located close to an edge of said sheet and wherein an outside surface of said second sheet is flush with said edge.

12. The combination of claim 11, wherein the sides of said channel are formed by smooth inner walls of said arms.

13. The combination of claim 12, wherein said second sheet is affixed to said insert by a thread-forming screw.

14. The combination of claim 8, wherein the bottom of said base is flush with a surface of said sheet.

15. A metal, clinch-type insert, comprising:

a rigid rectangular base having two opposing side edges, each side edge including a pair of lands with an undercut groove for receiving a cold flow of metal located between each of said two pairs of lands;

a neck connecting the top of said base to a cylindrical sleeve forming a bore with an axis parallel to said grooves; and;

a planar support surface without lands, said surface lying in a plane perpendicular to said base.

* * * * *